(12) United States Patent
Nagano et al.

(10) Patent No.: US 7,090,925 B2
(45) Date of Patent: Aug. 15, 2006

(54) DIELECTRIC FILMS AND MATERIALS THEREFOR

(75) Inventors: Shinya Nagano, Himeji (JP); Jiichiro Hashimoto, Himeji (JP); Kiyoharu Tsutsumi, Himeji (JP); Yoshinori Funaki, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 2 days.

(21) Appl. No.: 10/807,326

(22) Filed: Mar. 24, 2004

(65) Prior Publication Data

US 2004/0192880 A1 Sep. 30, 2004

(30) Foreign Application Priority Data

Mar. 26, 2003 (JP) ............................. 2003-086164
Sep. 18, 2003 (JP) ............................. 2003-325518

(51) Int. Cl.
*B32B 27/00* (2006.01)
*C08G 73/10* (2006.01)

(52) U.S. Cl. ............... 428/473.5; 428/1.26; 428/411.1; 428/209; 428/458; 528/125; 528/126; 528/128; 528/172; 528/173; 528/176; 528/179; 528/183; 528/188; 528/220; 528/229; 528/350; 528/353; 528/351

(58) Field of Classification Search ............. 428/473.5, 428/1.26, 458, 209, 411.1; 528/125–126, 528/128, 172, 173, 176, 179, 183, 188, 220, 528/229, 350, 351, 353
See application file for complete search history.

(56) References Cited

U.S. PATENT DOCUMENTS

| 4,142,036 | A | 2/1979 | Feinstein et al. | |
|---|---|---|---|---|
| 6,670,499 | B1 * | 12/2003 | Inoue et al. | 560/117 |
| 6,903,006 | B1 * | 6/2005 | Aoi | 438/627 |
| 2002/0034873 | A1 | 3/2002 | Aoi | 438/627 |

FOREIGN PATENT DOCUMENTS

| JP | 62-183881 A | 8/1987 |
|---|---|---|
| JP | 2001-332543 A | 11/2001 |
| JP | 2004-307803 | * 11/2004 |

OTHER PUBLICATIONS

Moon et al., *Journal of Polymer Science*, Part A-1, vol. 8, No. 12, (1970), pp. 3665-3666, the month in the date of publication is not available.
Moon, S. et al.; J. Polym. Sci., Part A1, vol. 8, No. 12, pp. 3665-3666 (1970) ; XP002284770, the month in the date of publication is not available.
Chern, Yaw-Terng et al.; J. Polym. Sci., Part A, Polym. Chem., vol. 36, pp. 785-792 (1998) ; XP002284771, the month in the date of publication is not available.
Hsiao, Sheng-Huei et al., J. Polym. Sci., Part A, Polym. Chem., vol. 37, pp. 1619-1628 (1999) ; XP002284772, the month in the date of publication is not available.
Guo, Wenzhuo et al., Tetrahedron Letters, vol. 41, pp. 7419-7421 (2001) ; XP002284860, the month in the date of publication is not available.

* cited by examiner

*Primary Examiner*—P. Hampton Hightower
(74) *Attorney, Agent, or Firm*—Birch, Stewart, Kolasch & Birch, LLP

(57) ABSTRACT

A material for dielectric films is a polymerizable composition containing an adamantanepolycarboxylic acid represented by following Formula (1):
wherein X is a hydrogen atom, a carboxyl group or a hydrocarbon group; and $Y^1$, $Y^2$, $Y^3$ and $Y^4$ are the same as or different from one another and are each a single bond or a bivalent aromatic cyclic group; an aromatic polyamine represented by following Formula (2):
wherein Ring Z is a monocyclic or polycyclic aromatic ring; and $R^1$ and $R^2$ are each a substituent bound to Ring Z, are the same as or different from each other and are each an amino group, a mono-substituted amino group, a hydroxyl group or a mercapto group; and a solvent other than ketones and aldehydes, in which the adamantanepolycarboxylic acid and aromatic polyamine are dissolved in the solvent 4 Claims, 2 Drawing Sheets

DIELECTRIC FILMS AND MATERIALS THEREFOR

This Nonprovisional application claims priority under 35 U.S.C. § 119(a) on Patent Application No(s). JP2003-086164 and JP2003-325518 filed in JAPAN on Mar. 26, 2003 and Sep. 18, 2003, respectively, the entire contents of which are hereby incorporated by reference.

BACKGROUND OF THE INVENTION

1. Field of the Invention

The present invention relates to a material for the formation of a polybenzazole (imidazole, oxazole or thiazole) film having high heat resistance and a low dielectric constant, as well as a polymer and a dielectric film using the material. More specifically, it relates to a material for the formation of a dielectric film which is useful as a semiconductor part, as well as a polymer and a dielectric film using the material.

2. Description of the Related Art

Polybenzazoles having an adamantane skeleton are useful as highly heat-resistant resins (Journal of Polymer Science, Part A-1 (1970), 8(12), p. 3665–3666). In particular, highly crosslinked polybenzazoles using a trifunctional or tetrafunctional adamantane derivative involve a multitude of molecular-scale voids, have a low relative dielectric constant and satisfactory mechanical strength and heat resistance and are thereby very useful as materials for interlayer dielectrics (Japanese Unexamined Patent Application Publication (JP-A) No. 2001-332543). These highly crosslinked polybenzazoles can be prepared, for example, by heating a material in the presence of a condensing agent such as a polyphosphoric acid. However, the resulting highly crosslinked resin is hardly soluble in solvent and cannot be significantly applied to a substrate by coating to form a thin film.

A thin film of a wholly aromatic chain polybenzazole is formed by a method, in which an aldehyde derivative as a material monomer is spread over an aqueous solution of an amine as another material monomer to form a film by polymerization on a gas-liquid interface; the film is laminated on a substrate by a horizontal attachment method and is subjected to a thermal treatment in the air to form a thin film of a polybenzazole (Japanese Unexamined Patent Application Publication (JP-A) No. 62-183881). However, the method is not suitable for industrial production, since it takes quite a long time to form the thin film. In addition, the precursor polyimine is subjected to an oxidative thermal treatment in a final process, and the resulting polybenzazole film may be possibly oxidized, thus a lower dielectric constant as a dielectric film is not expected.

SUMMARY OF THE INVENTION

Accordingly, an object of the present invention is to provide a material for dielectric films, which can easily yield a film containing a highly crosslinked polybenzazole and having high heat resistance and a low dielectric constant.

Another object of the present invention is to provide a polymer formed from specific compounds, and a dielectric film which contains the polymer and is useful as, for example, semiconductor parts.

After intensive investigations to achieve the above objects, the present inventors have found that a highly functional highly crosslinked polybenzazole film can be formed by dissolving an adamantanepolycarboxylic acid and an aromatic polyamine in a specific solvent. The present invention has been accomplished based on these findings.

Specifically, the present invention provides a material for dielectric films, which is a polymerizable composition containing an adamantanepolycarboxylic acid represented by following Formula (1):

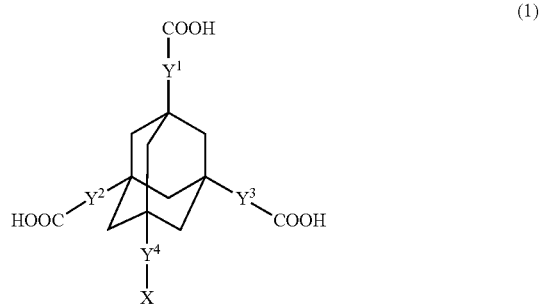

(1)

wherein X is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group, an aromatic polyamine represented by following Formula (2):

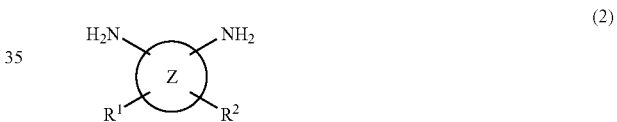

(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group; and a solvent other than ketones and aldehydes, wherein the adamantanepolycarboxylic acid and the aromatic polyamine are dissolved in the solvent.

The present invention also provides a polymer which is a polymerized product of a polymerizable composition containing an adamantanepolycarboxylic acid represented by following Formula (1):

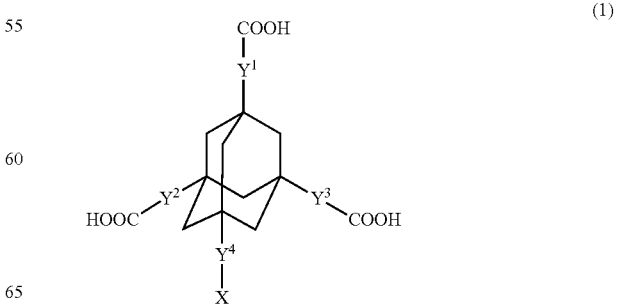

(1)

wherein X is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group; an aromatic polyamine represented by following Formula (2):

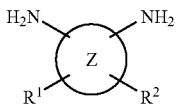
(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group; and a solvent other than ketones and aldehydes, wherein the adamantanepolycarboxylic acid and the aromatic polyamine are dissolved in the solvent.

The present invention further provides a polymer which is a polymerized product of an adamantanepolycarboxylic acid represented by following Formula (1a):

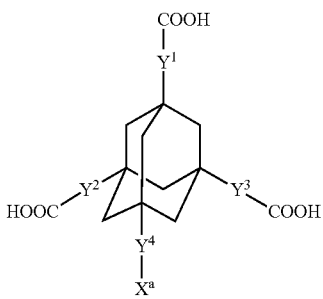
(1a)

wherein $X^a$ is a hydrogen atom or a hydrocarbon group; and $Y^1$, $Y^2$, $Y^3$ and $Y^4$ may be the same as or different from each other and are each a single bond or a bivalent aromatic cyclic group, and an aromatic polyamine represented by following Formula (2):

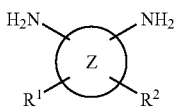
(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group.

The present invention further provides a dielectric film containing one of the polymers.

The present invention also provides a dielectric film containing a polymer formed from an adamantanepolycarboxylic acid represented by following Formula (1):

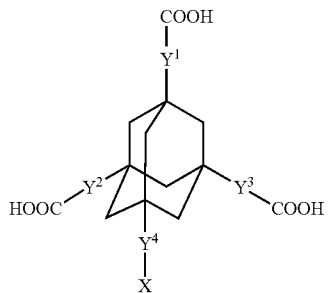
(1)

wherein X is a hydrogen atom, a carboxyl group or a hydrocarbon group; $Y^1$, $Y^2$, $Y^3$ and $Y^4$ may be the same as or different from one another and are each a single bond or a bivalent aromatic cyclic group; and an aromatic polyamine represented by following Formula (2):

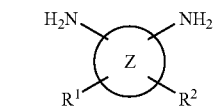
(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group, in which the dielectric film has a 5% weight loss temperature of 500° C. or higher.

The material for dielectric films of the present invention uses a solvent other than ketones and aldehydes and can easily yield a highly crosslinked polymer, whose polymerization reaction is not adversely affected by a Schiff base formed with a monomer component aromatic polyamine. The resulting dielectric film formed by using the material can have high heat resistance and a low dielectric constant.

Further objects, features and advantages of the present invention will become apparent from the following description of the preferred embodiments with reference to the attached drawings.

DESCRIPTION OF THE PREFERRED EMBODIMENTS

Figure 1:
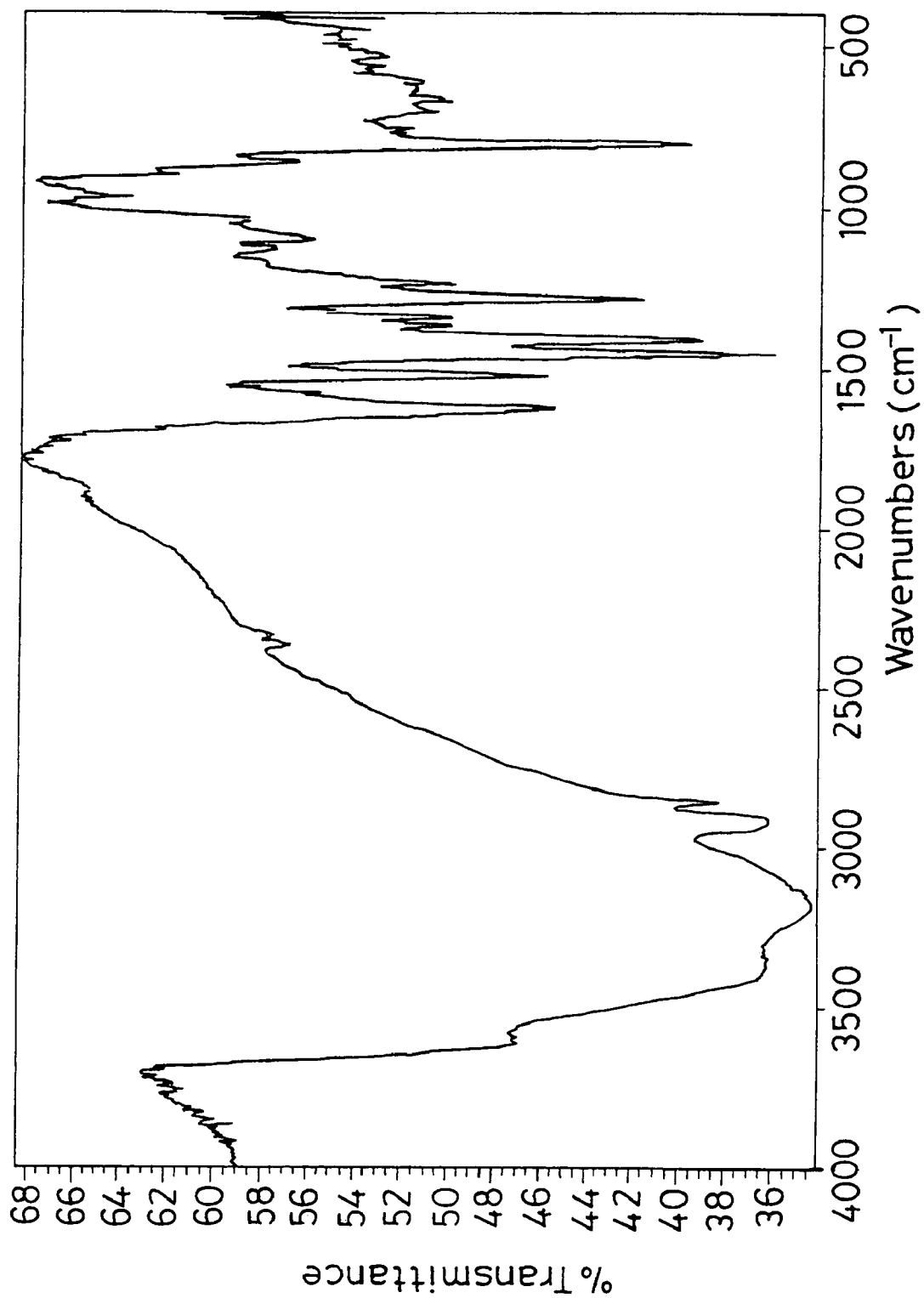
FIG. 1 shows an infrared absorption spectrum of a polymer film prepared in Example 1.

The material for dielectric films of the present invention is a polymerizable composition as a solution of an adamantanepolycarboxylic acid represented by Formula (1) and an aromatic polyamine represented by Formula (2) in a solvent other than ketones and aldehydes.

Adamantanepolycarboxylic Acid

The adamantanepolycarboxylic acid represented by Formula (1) serves as a highly crosslinkable monomer component and constitutes the material for dielectric films of the present invention. In Formula (1), the hydrocarbon group in X includes, for example, aliphatic hydrocarbon groups, alicyclic hydrocarbon groups, aromatic hydrocarbon groups, and groups comprising two or more of these groups combined with each other. Examples of the aliphatic hydrocarbon groups are methyl, ethyl, propyl, isopropyl, butyl, isobutyl, s-butyl, t-butyl, pentyl, hexyl, decyl, dodecyl, and other straight-or branched-chain alkyl groups each having about 1 to about 20 carbon atoms, of which those having 1 to 10 carbon atoms are preferred, and those having 1 to 6 carbon atoms are more preferred; vinyl, allyl, 1-butenyl, 3-methyl-4-pentenyl, and other straight- or branched-chain alkenyl groups each having about 2 to about 20 carbon atoms, of which those having 2 to 10 carbon atoms are preferred, and those having 2 to 5 carbon atoms are more preferred; ethynyl, propynyl, 1-butynyl, 2-butynyl, and other straight- or branched-chain alkynyl groups each having about 2 to about 20 carbon atoms, of which those having 2 to 10 carbon atoms are preferred, and those having 2 to 5 carbon atoms are more preferred.

Examples of the alicyclic hydrocarbon groups are monocyclic alicyclic hydrocarbon groups, such as cyclopropyl, cyclobutyl, cyclopentyl, cyclohexyl, cyclooctyl, and other cycloalkyl groups each having about 3 to about 20 members, of which those having 3 to 15 members are preferred, and those having 3 to 12 members are more preferred; cyclopropenyl, cyclobutenyl, cyclopentenyl, cyclohexenyl, and other cycloalkenyl groups each having about 3 to about 20 members, of which those having 3 to 15 members are preferred, and those having 3 to 10 members are more preferred. Examples of the alicyclic hydrocarbon groups also include bridged hydrocarbon groups each having, for example, a bicyclic, tricyclic or tetracyclic hydrocarbon ring such as adamantane ring, perhydroindene ring, decalin ring, perhydrofluorene ring, perhydroanthracene ring, perhydrophenanthrene ring, tricyclo[5.2.1.0$^{2,6}$] decane ring, perhydroacenaphthene ring, perhydrophenalene ring, norbornane ring, and norbornene ring. Examples of the aromatic hydrocarbon groups are phenyl, naphthyl, and other aromatic hydrocarbon groups each having about 6 to about 20 carbon atoms, of which those having 6 to 14 carbon atoms are preferred.

Examples of hydrocarbon groups comprising an aliphatic hydrocarbon group and an alicyclic hydrocarbon group combined with each other include cyclopentylmethyl, cyclohexylmethyl, 2-cyclohexylethyl, other $C_3$–$C_{20}$ cycloalkyl-$C_1$–$C_4$ alkyl groups, and other cycloalkyl-alkyl groups. Examples of hydrocarbon groups comprising an aliphatic hydrocarbon group and an aromatic hydrocarbon group combined with each other include $C_7$–$C_{18}$ aralkyl groups, and other aralkyl groups; and phenyl or naphthyl group substituted with about one to about four $C_1$–$C_4$ alkyl groups, and other alkyl-substituted aryl groups.

These aliphatic hydrocarbon groups, alicyclic hydrocarbon groups, aromatic hydrocarbon groups, and groups comprising these groups combined with each other may each have one or more substituents. Such substituents are not specifically limited, as long as they do not adversely affect the reaction and examples thereof include halogen atoms such as fluorine, chlorine, bromine and iodine atoms; substituted oxy groups including alkoxy groups such as methoxy and ethoxy groups, cycloalkyloxy groups, aryloxy groups, acyloxy groups, and silyloxy groups; substituted oxycarbonyl groups such as alkyloxycarbonyl groups and aryloxycarbonyl groups; acyl groups such as acetyl group and other aliphatic acyl groups, acetoacetyl group, alicyclic acyl groups, and aromatic acyl groups; aliphatic hydrocarbon groups; alicyclic hydrocarbon groups; aromatic hydrocarbon groups; and heterocyclic groups.

The substituent X is preferably a hydrogen atom, a carboxyl group, a $C_1$–$C_6$ alkyl group or a $C_6$–$C_{14}$ aromatic hydrocarbon group. Among them, a carboxyl group is typically preferred, since the resulting adamantane compound has four functional groups and can be crosslinked more highly.

Examples of the aromatic ring corresponding to the bivalent aromatic cyclic group in $Y^1$, $Y^2$, $Y^3$ and $Y^4$ include monocyclic or polycyclic aromatic hydrocarbon rings and aromatic heterocyclic rings. An example of the monocyclic aromatic hydrocarbon rings is benzene ring. Examples of the polycyclic hydrocarbon rings are naphthalene ring, anthracene ring, phenanthrene ring, phenalene ring, and other rings having a fused ring structure in which two or more aromatic rings commonly possess two or more atoms; and biphenyl ring, biphenylene ring, fluorene ring, and other rings having a structure in which two or more aromatic rings are bound via a linkage group such as a single bond, or an alicyclic ring. Examples of the aromatic heterocyclic rings are monocyclic or polycyclic aromatic heterocyclic rings containing one or more hetero atoms such as oxygen atom, sulfur atom and nitrogen atom. Specific examples of the aromatic heterocyclic rings are furan ring, thiophene ring, pyridine ring, picoline ring, and other monocycles; quinoline ring, isoquinoline ring, acridine ring, phenazine ring, and other polycycles. These aromatic rings may each have one or more substituents. Examples of such substituents are those exemplified as the subsistent which the hydrocarbon group in X may have.

Typical examples of the adamantanepolycarboxylic acids are 1,3,5-adamantanetricarboxylic acid, 7-methyl-1,3,5-adamantanetricarboxylic acid, 7-phenyl-1,3,5-adamantanetricarboxylic acid, 1,3,5-tris(4-carboxyphenyl)adamantane, 1,3,5-tris(4-carboxyphenyl)-7-methyladamantane, 1,3,5-tris(4-carboxyphenyl)-7-phenyladamantane, 1,3,5,7-adamantanetetracarboxylic acid, and 1,3,5,7-tetrakis(4-carboxyphenyl)adamantane.

Each of these adamantanepolycarboxylic acids can be used alone or in combination.

The adamantanepolycarboxylic acids represented by Formula (1) can be prepared according to a known or conventional procedure not specifically limited. For example, an adamantanepolycarboxylic acid, in which $Y^1$, $Y^2$, $Y^3$ and $Y^4$ in Formula (1) are aromatic rings, can be prepared by the following process. An aromatic compound corresponding to $Y^1$, $Y^2$, $Y^3$ and $Y^4$ is reacted with 1,3,5,7-tetrabromoadamantane by catalysis of $AlCl_3$ to form 1,3,5,7-tetra-aromatic-ring-adamantane; for example, the para-position of the 1,3,5,7-tetra-aromatic-ring adamantane is iodized with iodine; and the resulting 1,3,5,7-tetrakis(iodized aromatic ring-substituted)adamantane is carboxylated in the presence of carbon dioxide by catalysis of, for example, sec-butyllithium, to yield the target compound.

The adamantanepolycarboxylic acids represented by Formula (1a) correspond to adamantanepolycarboxylic acids of Formula (1), wherein X is a hydrogen atom or a hydrocarbon group.

Aromatic Polyamine

The aromatic polyamine represented by Formula (2) serves as a monomer component constituting the material for dielectric films of the present invention, in addition to the adamantanepolycarboxylic acid. The aromatic ring in Ring Z in Formula (2) can be any of those exemplified as the aromatic ring corresponding to the bivalent aromatic cyclic group in $Y^1$, $Y^2$, $Y^3$ and $Y^4$. The aromatic ring may have one or more substituents. Such substituents are not specifically limited, as long as they do not adversely affect the reaction. Typical examples of the substituents are halogen atoms such as bromine, chlorine, and fluorine atoms; aliphatic hydrocarbon groups such as methyl, ethyl, propyl, butyl, t-butyl, and other $C_1$–$C_4$ alkyl groups; alicyclic hydrocarbon groups such as cyclohexyl group, and other cycloalkyl groups having about 3 to about 15 members; aromatic hydrocarbon groups such as phenyl, benzyl, naphthyl, toluyl group, and other aromatic hydrocarbon groups having about 6 to about 20 carbon atoms, of which those having 6 to 14 carbon atoms are preferred; hydroxyl group which may be protected by a protecting group; amino group which may be protected by a protecting group; and mercapto group which may be protected by a protecting group. Conventional protecting groups in the field of organic synthesis can be used herein.

Examples of the mono-substituted amino group in $R^1$ and $R^2$ are groups corresponding to an amino group, except with a substituent replacing one of the hydrogen atoms of the amino group. Examples of the substituent are aliphatic hydrocarbon groups such as methyl, ethyl, propyl, butyl, t-butyl, and other alkyl groups having about 1 to 10 carbon atoms, of which those having about 1 to about 6 carbon atoms are preferred, alkenyl groups having about 2 to about 10 carbon atoms, of which those having about 2 to about 5 carbon atoms are preferred, alkynyl groups having about 2 to about 10 carbon atoms, of which those having about 2 to about 5 carbon atoms are preferred; alicyclic hydrocarbon groups such as cyclohexyl group, and other cycloalkyl groups having about 3 to about 15 members, of which those having about 3 to about 12 carbon atoms are preferred; and aromatic hydrocarbon groups such as phenyl, benzyl, naphthyl, toluyl, and other aromatic hydrocarbon groups having about 6 to about 14 carbon atoms. The groups $R^1$ and R2 in Ring Z in Formula (2) are preferably positioned at the alpha-position or the beta-position with respect to a carbon atom having —$NH_2$ (amino group) in Ring Z, respectively.

For example, a 5-membered azole ring is formed as a result of the reaction between an aromatic polyamine having $R^1$ (or R2) at the alpha-position of the carbon atom having —$NH_2$ (amino group) in Ring Z, and an adamantanepolycarboxylic acid. More specifically, an imidazole ring is formed when $R^1$ is an amino group or mono-substituted amino group; an oxazole ring is formed when $R^1$ is a hydroxyl group; and a thiazole ring is formed when $R^1$ is a mercapto group.

A 6-membered nitrogen-containing ring is formed as a result of the reaction between an aromatic polyamine having $R^1$ (or $R^2$) at the beta-position of the carbon atom having —$NH_2$ (amino group) in Ring Z, and an adamantanepolycarboxylic acid. More specifically, a hydrodiazine ring is formed when $R^1$ is an amino group or a mono-substituted amino group; an oxazine ring is formed when $R^1$ is a hydroxyl group; and a thiazine ring is formed when $R^1$ is a mercapto group.

The positions of the two amino groups in Ring Z in Formula (2) are not specifically limited, as long as these groups can be combined with carboxyl groups in the adamantanepolycarboxylic acid to form, for example, a 5- or 6-membered ring together with adjacent carbon atoms, and are preferably such positions that the two amino groups are not adjacent to each other.

Typical examples of the aromatic polyamine are
1,2,4,5-tetraaminobenzene,
1,4-diamino-2,5-dihydroxybenzene,
1,5-diamino-2,4-dihydroxybenzene,
1,4-diamino-2,5-dimercaptobenzene,
1,5-diamino-2,4-dimercaptobenzene,
1,4-diamino-2,5-bis(methylamino)benzene,
1,5-diamino-2,4-bis(methylamino)benzene,
1,4-diamino-2,5-bis(phenylamino)benzene,
1,5-diamino-2,4-bis(phenylamino)benzene, and other polyaminobenzenes; 2,3,6,7-tetraaminonaphthalene,
1,4,5,8-tetraaminonaphthalene,
2,6-diamino-3,7-dihydroxynaphthalene,
2,7-diamino-3,6-dihydroxynaphthalene,
1,4-diamino-5,8-dihydroxynaphthalene,
1,5-diamino-4,8-dihydroxynaphthalene,
2,6-diamino-3,7-dimercaptonaphthalene,
2,7-diamino-3,6-dimercaptonaphthalene,
1,4-diamino-5,8-dimercaptonaphthalene,
1,5-diamino-4,8-dimercaptonaphthalene,
2,6-diamino-3,7-bis(methylamino)naphthalene,
2,7-diamino-3,6-bis(methylamino)naphthalene,
1,4-diamino-5,8-bis(methylamino)naphthalene,
1,5-diamino-4,8-bis(methylamino)naphthalene,
2,6-diamino-3,7-bis(phenylamino)naphthalene,
2,7-diamino-3,6-bis(phenylamino)naphthalene,
1,4-diamino-5,8-bis(phenylamino)naphthalene,
1,5-diamino-4,8-bis(phenylamino)naphthalene, and other polyaminonaphthalenes; 3,3'-diaminobenzidine,
3,3'-dihydroxybenzidine,
3,4'-diamino-3', 4-dihydroxybiphenyl,
3,3'-dimercaptobenzidine,
3,4'-diamino-3', 4-dimercaptobiphenyl,
3,3'-bis(methylamino)benzidine,
3,4'-diamino-3', 4-bis(methylamino)biphenyl,
3,3'-bis(phenylamino)benzidine,
3,4'-diamino-3', 4-bis(phenylamino)biphenyl, and other polyaminobiphenyls.

Typical examples of the aromatic polyamine also include
2,3,6,7-tetraaminoanthracene,
2,6-diamino-3,7-dihydroxyanthracene,
2,7-diamino-3,6-dihydroxyanthracene,
2,6-diamino-3,7-dimercaptoanthracene,
2,7-diamino-3,6-dimercaptoanthracene,
2,6-diamino-3,7-bis(methylamino)anthracene,
2,7-diamino-3,6-bis(methylamino)anthracene,
2,6-diamino-3,7-bis(phenylamino)anthracene,
2,7-diamino-3,6-bis(phenylamino)anthracene, and other polyaminoanthracenes; 2,3,7,8-tetraamino-1H-phenalene,
3,8-diamino-2,7-dihydroxy-1H-phenalene,
2,8-diamino-3,7-dihydroxy-1H-phenalene,
3,8-diamino-2,7-dimercapto-1H-phenalene,
2,8-diamino-3,7-dimercapto-1H-phenalene,
3,8-diamino-2,7-bis(methylamino)-1H-phenalene,
2,8-diamino-3,7-bis(methylamino)-1H-phenalene,
3,8-diamino-2,7-bis(phenylamino)-1H-phenalene,
2,8-diamino-3,7-bis(phenylamino)-1H-phenalene, and other polyaminophenalenes; 4,5,9,10-tetraaminopyrene,
4,9-diamino-5,10-dihydroxypyrene,
4,10-diamino-5,9-dihydroxypyrene,
4,9-diamino-5,10-dimercaptopyrene,
4,10-diamino-5,9-dimercaptopyrene,
4,9-diamino-5,10-bis(methylamino)pyrene,
4,10-diamino-5,9-bis(methylamino)pyrene,
4,9-diamino-5,10-bis(phenylamino)pyrene, 4,10-diamino-5,9-bis(phenylamino)pyrene, and other polyaminopyrenes.

Each of these aromatic polyamines can be used alone or in combination. The aromatic polyamines represented by Formula (2) can be prepared according to a known or conventional procedure.

Other Components

The material for dielectric films (hereinafter may be referred to as "material composition") of the present invention may further comprise other components in addition to the above components. For example, the material composition may further comprise a catalyst for accelerating the polymerization reaction. Typical examples of the catalyst are sulfuric acid, methanesulfonic acid, p-toluenesulfonic acid, and other acid catalysts. The amount of the catalyst is, for example, from about 0% by mole to about 10% by mole, and preferably from about 0% by mole to about 5% by mole relative to the total amount of the monomer components (the adamantanepolycarboxylic acid and the aromatic polyamine). The material composition may comprise a thickening agent (bodying agent) for increasing the viscosity of the resulting composition as a solution. Typical examples of the thickening agent are ethylene glycol, diethylene glycol, triethylene glycol, polyethylene glycol, and other alkylene glycols and polyalkylene glycols. The amount of the thickening agent is, for example, from about 0% by weight to about 20% by weight, and preferably from about 0% by weight to about 10% by weight based on the total amount of the material composition (coating liquid). The material composition may also comprise a monocarboxylic acid for adjusting the molecular weight of the resulting polymer, and/or a dicarboxylic acid for adjusting the degree of crosslinking of the polymer. Typical examples of the monocarboxylic acid are adamantanecarboxylic acid and benzoic acid. Typical examples of the dicarboxylic acid are adamantanedicarboxylic acid and terephthalic acid. The amount of the monocarboxylic acid is, for example, from about 0% by mole to about 10% by mole, and preferably from about 0% by mole to about 5% by mole relative to the adamantanepolycarboxylic acid. The amount of the dicarboxylic acid is, for example, from about 0% by mole to about 100% by mole, and preferably from about 0% by mole to about 50% by mole relative to the adamantanepolycarboxylic acid.

The material composition may contain an adhesion promoter for increasing the adhesion of the resulting dielectric film to a substrate. Typical examples of the adhesion promoter is trimethoxyvinylsilane, hexamethyldisilazane, γ-aminopropyltriethoxysilane, and aluminum monoethylacetoacetate diisopropylate. The amount of the adhesion promoter is, for example, from about 0% by weight to about 10% by weight, and preferably from about 0% by weight to about 5% by weight relative to the total amount of the monomer components.

Solvent

The solvent for use in the present invention is not specifically limited, as long as it is a solvent other than ketones and aldehydes. Examples of the solvent are aliphatic hydrocarbons such as hexane, heptane and octane; alicyclic hydrocarbons such as cyclohexane and methylcyclohexane; aromatic hydrocarbons such as benzene, toluene, xylenes, ethylbenzene and mesitylene; halogenated hydrocarbons such as dichloromethane, dichloroethane, chloroform and carbon tetrachloride; alcohols such as methanol, ethanol, propanol, butanol and ethylene glycol; ethers such as dioxane, tetrahydrofuran, diethyl ether and propylene glycol monomethyl ether (PGME); esters such as formic esters, acetic esters, propionic esters, benzoic esters, γ-butyrolactone and propylene glycol monomethyl ether acetate (PGMEA); carboxylic acids such as formic acid, acetic acid, propionic acid and butyric acid; aprotic polar solvents such as acetonitrile, propionitrile, benzonitrile and other nitriles, formamide, dimethylformamide, acetamide, dimethylacetamide, N-methylpyrrolidone and other amides, and dimethylsulfoxide and other sulfoxides. Each of these solvents can be used alone or in combination.

One of the important features of the present invention is that a solvent other than ketones and aldehydes is used as a solvent for dissolving the monomer components. If a ketone or an aldehyde is used as a solvent, the solvent itself reacts with the monomer component aromatic polyamine to form a Schiff base which adversely affects the polymerization reaction to thereby fail to give a high degree of crosslinking. In contrast, a solvent other than ketones and aldehydes neither reacts with the aromatic polyamine nor adversely affects the polymerization reaction and can form a highly crosslinked polymer (high molecular weight crosslinked product) to thereby yield a polymer film having high heat resistance and a low dielectric constant.

Material for Dielectric Films

The polymerizable composition as the material for dielectric films (material composition) can be prepared according to any procedure, as long as the adamantanepolycarboxylic acid and the aromatic polyamine (monomer components) can be completely dissolved in the solvent. For example, it can be prepared by stirring or leaving stand a mixture comprising the monomer components, the solvent, and other components. The ratio of the adamantanepolycarboxylic acid to the aromatic polyamine can be set freely depending on the solubility in the solvent, as long as the functions of the resulting dielectric film are not adversely affected. The molar ratio of the adamantanepolycarboxylic acid to the aromatic polyamine is preferably from about 10:90 to about 60:40, and more preferably from about 20:80 to about 50:50. The total amount of the adamantanepolycarboxylic acid and the aromatic polyamine (total monomer amount) can be arbitrarily set depending on the solubility in the solvent and is, for example, from about 1% by weight to about 60% by weight, and preferably from about 5% by weight to about 50% by weight relative to the amount of the solvent.

The components may be dissolved in the solvent in any atmosphere such as air atmosphere, as long as the aromatic polyamine is not oxidized, but preferably in an atmosphere of inert gas such as nitrogen or argon gas. The temperature for dissolution is not specifically limited and, where necessary, the composition may be heated depending on the solubility of the monomer components and the boiling point of the solvent. The temperature for dissolution is, for example, from about 0° C. to 200° C., and preferably from about 10° C. to about 150° C.

To form a dielectric film exhibiting high heat resistance due to its high degree of crosslinking, a possible material is a polycondensed product (polybenzazole) of an adamantanepolycarboxylic acid and an aromatic polyamine. However, such a polycondensed polybenzazole has a high degree of crosslinking, thereby has a low solubility in solvent and cannot be significantly used as a material for forming a thin dielectric film by coating. In contrast, the material composition containing the monomer components completely dissolved in the solvent can be applied to a substrate as intact as a coating liquid. The applied film can be polymerized to thereby easily form a dielectric film comprising a highly crosslinked polybenzazole.

Dielectric Film

The dielectric film of the present invention is formed by applying the material composition of the present invention to a substrate. More specifically, the dielectric film is formed, for example, by applying the polymerizable material composition to a substrate and polymerizing the applied film by heating. Examples of the substrate are silicon wafers, metal substrates, and ceramic substrates. The material composition can be applied according to a conventional procedure not specifically limited, such as spin coating, dip coating or spray coating.

The heating can be performed at any temperature, as long as the polymerizable components can be polymerized, and is performed at a temperature, for example, from about 100° C. to about 500° C., and preferably from about 150° C. to about 450° C. at a constant temperature or with a stepwise temperature gradient. The heating can be performed in any atmosphere such as air atmosphere, as long as the properties of the resulting thin film are not adversely affected, but preferably in an atmosphere of inert gas such as nitrogen or argon gas, or in vacuo.

As a result of heating, the polycondensation reaction between the adamantanepolycarboxylic acid and the aromatic polyamine in the material composition proceeds to form a polybenzazole (an imidazole, an oxazole or a thiazole) having an adamantane skeleton as a polymer (high molecular weight crosslinked product) of the present invention.

The dielectric film of the present invention preferably has a 5% weight loss temperature of 500° C. or higher. After investigations on the formation of dielectric films, the present inventors have found that, if a ketone or aldehyde is used as a solvent, the solvent reacts with the monomer component aromatic polyamine to form a Schiff base to thereby adversely affect the cyclization between the aromatic polyamine and the adamantanepolycarboxylic acid, and the resulting polymer does not have a uniform structure due to the presence of, for example, free carboxyl groups and amido groups in the molecule. The present invention has been accomplished based on these findings. According to the present invention, a solvent other than ketones and aldehydes is used to thereby avoid the above problems, and a complete ring can be formed by the polycondensation reaction between, for example, an amino group of the aromatic polyamine and a carboxyl group of the adamantanepolycarboxylic acid to thereby yield a highly crosslinked polybenzazole as a polymerized product. Thus, the dielectric film of the present invention has a 5% weight loss temperature of generally 500° C. or higher and can exhibit high heat resistance. The 5% weight loss temperature is controlled by the degree of crosslinking of the polymer constituting the dielectric film, can be adjusted by appropriately selecting the monomer components and is preferably 530° C. or higher, and more preferably 550° C. or higher. If the 5% weight loss temperature is lower than 500° C., the dielectric film may have insufficient heat resistance and is not suitable as an electronic material part in semiconductor devices.

The relative dielectric constant of the dielectric film is preferably lower from the view point of insulating properties, and is, for example, 2.8 or less, preferably 2.6 or less, and typically preferably 2.3 or less. The dielectric film of the present invention is a polymer having an adamantane ring, aromatic ring, and azole ring or 6-membered nitrogen-containing ring (a ring formed in a polycondensed moiety) as main constitutional units. For example, by using an adamantanepolycarboxylic acid having three functional groups, a highly crosslinked polymer film can be formed, in which the adamantane compound having a three-dimensional structure and the aromatic polyamine having a two-dimensional structure are combined to form a structure having crosslinks in three directions with the adamantane skeleton as vertexes (crosslinking points). That is, the film has a unit in which three hexagons commonly possess two vertexes or two sides. By using an adamantanepolycarboxylic acid having four functional groups, a net polymer film can be formed, in which crosslinks are formed in four directions with the adamantane skeleton as vertexes (crosslinking points). That is, the film has a unit in which three hexagons commonly possess two sides. Thus, the dielectric film of the present invention involves a multitude of uniformly dispersed molecular-scale voids and can have a satisfactorily low relative dielectric constant.

The dielectric films of the present invention can be used, for example, as dielectric coatings in electronic material parts such as semiconductor devices and are particularly useful as interlayer dielectrics.

The present invention will be illustrated in further detail with reference to several examples and comparative examples below, which are not intended to limit the scope of the invention. The symbols "s", "m" and "w" in infrared absorption spectral data indicate absorption intensity of a wavelength indicated prior to each symbol and mean that the absorption is "strong", "medium" or "weak", respectively.

Evaluation Test

The properties of polybenzazole polymer films prepared in the examples and comparative examples were determined by the following methods.

5% Weight Loss Temperature

A sample polybenzazole polymer film was subjected to thermogravimetric analysis at a rise rate of 10° C./min in a nitrogen atmosphere using a thermogravimetry-differential thermal analyzer (TG-DTA) that can measure samples up to a maximum temperature of 550° C., and the temperature at which 5% of the total weight of the sample was reduced (5% weight loss temperature) was determined.

Relative Dielectric Constant

Aluminum (Al) electrodes were formed on the surface of a sample polybenzazole polymer film, and the relative dielectric constant was determined.

EXAMPLE 1

In a solvent N-methylpyrrolidone (NMP) were dissolved 5.37 g (20 mmol) of 1,3,5-adamantanetricarboxylic acid and 6.43 g (30 mmol) of 3,3'-diaminobenzidine at room temperature in a nitrogen atmosphere and thereby yielded a coating liquid. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the resulting polymer film was determined. The result is shown in FIG. 1, verifying that a target crosslinked polybenzimidazole film was formed. The film had a 5% weight loss temperature of 536° C. and a relative dielectric constant of 2.6.

Infrared absorption spectral data (cm$^{-1}$): 805 (m), 1280 (m), 1403 (m), 1450 (s), 1522 (w), 1625 (w), 2857 (w), 2928 (w), 3419 (w)

EXAMPLE 2

A crosslinked polybenzimidazole film was prepared by the procedure of Example 1, except that a 2:1 (by weight)

mixture of N-methylpyrrolidone (NMP) and tetrahydrofuran (THF) was used as the solvent instead of N-methylpyrrolidone alone. The film had a 5% weight loss temperature of 536° C. and a relative dielectric constant of 2.6.

EXAMPLE 3

A crosslinked polybenzimidazole film was prepared by the procedure of Example 1, except that a 2:1 (by weight) mixture of dimethylacetamide (DMAC) and tetrahydrofuran (THF) was used as the solvent instead of N-methylpyrrolidone alone. The film had a 5% weight loss temperature of 536° C. and a relative dielectric constant of 2.6.

EXAMPLE 4

A crosslinked polybenzimidazole film was prepared by the procedure of Example 1, except that 1,2,4,5-tetraaminobenzene was used instead of 3,3'-diaminobenzidine. The film had a 5% weight loss temperature of 530° C. and a relative dielectric constant of 2.7.

EXAMPLE 5

A crosslinked polybenzimidazole film was prepared by the procedure of Example 1, except that 2,3,6,7-tetraaminonaphthalene was used instead of 3,3'-diaminobenzidine. The film had a 5% weight loss temperature of 542° C. and a relative dielectric constant of 2.6.

EXAMPLE 6

A crosslinked polybenzimidazole film was prepared by the procedure of Example 1, except that 4,5,9,10-tetraaminopyrene was used instead of 3,3'-diaminobenzidine. The film had a 5% weight loss temperature of 550° C. or higher and a relative dielectric constant of 2.6.

EXAMPLE 7

A crosslinked polybenzimidazole film was prepared by the procedure of Example 1, except that 2,3,6,7-tetraaminoanthracene was used instead of 3,3'-diaminobenzidine. The film had a 5% weight loss temperature of 550° C. or higher and a relative dielectric constant of 2.6.

EXAMPLE 8

A crosslinked polybenzimidazole film was prepared by the procedure of Example 1, except that 1,3-diamino-4,6-bis(phenylamino)benzene was used instead of 3,3'-diaminobenzidine. The film had a 5% weight loss temperature of 550° C. or higher and a relative dielectric constant of 2.6.

EXAMPLE 9

A crosslinked polybenzoxazole film was prepared by the procedure of Example 1, except that 3,3'-dihydroxybenzidine was used instead of 3,3'-diaminobenzidine. The film had a 5% weight loss temperature of 535° C. and a relative dielectric constant of 2.5.

EXAMPLE 10

A crosslinked polybenzothiazole film was prepared by the procedure of Example 1, except that 3,3'-dimercaptobenzidine was used instead of 3,3'-diaminobenzidine. The film had a 5% weight loss temperature of 540° C. and a relative dielectric constant of 2.5.

EXAMPLE 11

A crosslinked polybenzimidazole film was prepared by the procedure of Example 1, except that 1,3,5-tris(4-carboxyphenyl)adamantane and 1,2,4,5-tetraaminobenzene were used instead of 1,3,5-adamantanetricarboxylic acid and 3,3'-diaminobenzidine, respectively. The film had a 5% weight loss temperature of 550° C. or higher and a relative dielectric constant of 2.5.

EXAMPLE 12

A crosslinked polybenzimidazole film was prepared by the procedure of Example 1, except that 1,3,5-tris(4-carboxyphenyl)adamantane was used instead of 1,3, 5-adamantanetricarboxylic acid. The film had a 5% weight loss temperature of 550° C. or higher and a relative dielectric constant of 2.4.

COMPARATIVE EXAMPLE 1

Figure 2:
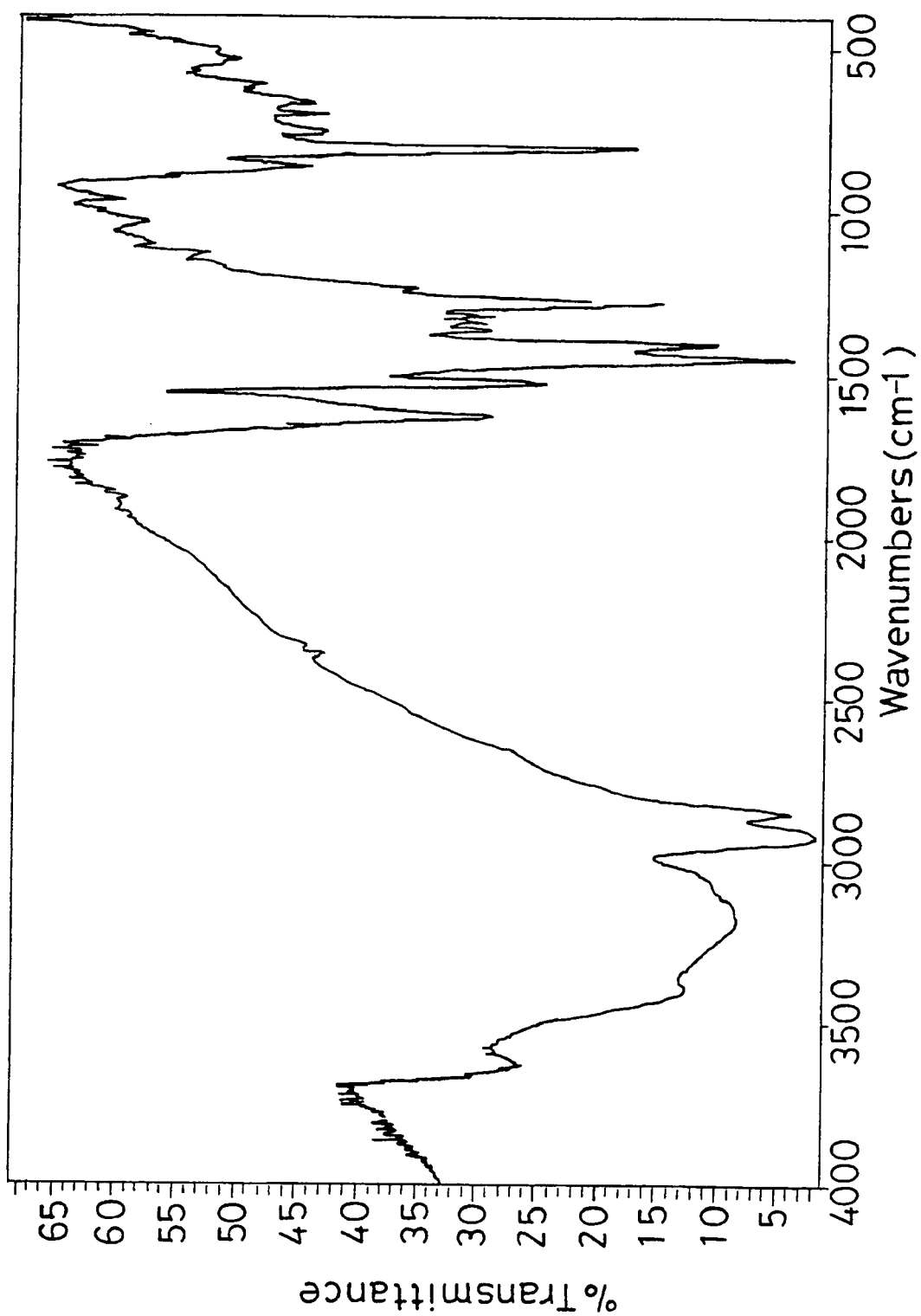
FIG. 2 shows an infrared absorption spectrum of a polymer film prepared in Comparative Example 1.

A polymer film was prepared by the procedure of Example 1, except that cyclohexanone (CHN) was used as the solvent instead of N-methylpyrrolidone. The infrared absorption spectrum of the polymer film was determined, and the result is shown in FIG. 2. FIG. 2 shows that the polymer had strong absorption at around 2900 $cm^{-1}$ (2857 $cm^{-1}$ and 2928 $cm^{-1}$), indicating that a Schiff base formed as a result of the reaction between the solvent cyclohexanone and the monomer aromatic polyamine remains and inhibits the formation of imidazole rings. The film had a 5% weight loss temperature of 426° C. and a relative dielectric constant of 2.9.

Infrared absorption spectral data ($cm^{-1}$): 805 (m), 1280 (m), 1403 (m), 1450 (s), 1522 (w), 1625 (w), 2857 (s), 2928 (s), 3419 (w)

COMPARATIVE EXAMPLE 2

A polymer film was prepared by the procedure of Example 1, except that cyclopentanone (CPN) was used as the solvent instead of N-methylpyrrolidone. The infrared absorption spectrum of the polymer film was determined. The polymer had strong absorption at around 2900 $cm^{-1}$ (2857 $cm^{-1}$ and 2928 $cm^{-1}$), indicating that a Schiff base formed as a result of the reaction between the solvent cyclopentanone and the monomer aromatic polyamine remains and inhibits the formation of imidazole rings. The film had a 5% weight loss temperature of 420° C. and a relative dielectric constant of 3.0.

Infrared absorption spectral data ($cm^{-1}$): 805 (m), 1280 (m), 1403 (m), 1450 (s), 1522 (w), 1625 (w), 2857 (s), 2928 (s), 3419 (w)

COMPARATIVE EXAMPLE 3

A polymer film was prepared by the procedure of Example 1, except that a 2:1 (by weight) mixture of N-methylpyrrolidone (NMP) and acetone was used as the solvent instead of N-methylpyrrolidone alone. The infrared absorption spectrum of the polymer film was determined. The polymer had medium absorption at around 2900 $cm^{-1}$ (2857 $cm^{-1}$ and 2928 $cm^{-1}$), indicating that a Schiff base formed as a result of the reaction between the solvent acetone and the monomer aromatic polyamine remains and inhibits the formation of imidazole rings. The film had a 5% weight loss temperature of 465° C. and a relative dielectric constant of 2.9.

Infrared absorption spectral data (cm$^{-1}$): 805 (m), 1280 (m), 1403 (m), 1450 (s), 1522 (w), 1625 (w), 2857 (m), 2928 (m), 3419 (w)

EXAMPLE 13

In a solvent N-methylpyrrolidone (NMP) were dissolved 5.37 g (20 mmol) of 1,3,5,7-adamantanetetracarboxylic acid and 8.57 g (40 mmol) of 3,3'-diaminobenzidine at room temperature in a nitrogen atmosphere and thereby yielded a coating liquid. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the resulting polymer film was determined, verifying that the target crosslinked polybenzimidazole film was formed. The film had a 5% weight loss temperature of 550° C. or higher and a relative dielectric constant of 2.3.

Infrared absorption spectral data (cm$^{-1}$): 805 (m), 1280 (m), 1403 (m), 1450 (s), 1522 (w), 1625 (w), 2857 (w), 2928 (w), 3419 (w)

EXAMPLE 14

A crosslinked polybenzimidazole film was prepared by the procedure of Example 13, except that a 2:1 (by weight) mixture of N-methylpyrrolidone (NMP) and tetrahydrofuran (THF) was used as the solvent instead of N-methylpyrrolidone alone. The film had a 5% weight loss temperature of 550° C. or higher and a relative dielectric constant of 2.3.

EXAMPLE 15

A crosslinked polybenzimidazole film was prepared by the procedure of Example 13, except that a 2:1 (by weight) mixture of dimethylacetamide (DMAC) and tetrahydrofuran (THF) was used as the solvent instead of N-methylpyrrolidone alone. The film had a 5% weight loss temperature of 550° C. or higher and a relative dielectric constant of 2.3.

EXAMPLE 16

A crosslinked polybenzimidazole film was prepared by the procedure of Example 13, except that 1,2,4,5-tetraaminobenzene was used instead of 3,3'-diaminobenzidine. The film had a 5% weight loss temperature of 550° C. or higher and a relative dielectric constant of 2.4.

EXAMPLE 17

A crosslinked polybenzimidazole film was prepared by the procedure of Example 13, except that 2,3,6,7-tetraaminonaphthalene was used instead of 3,3'-diaminobenzidine. The film had a 5% weight loss temperature of 550° C. or higher and a relative dielectric constant of 2.3.

EXAMPLE 18

A crosslinked polybenzimidazole film was prepared by the procedure of Example 13, except that 4,5,9,10-tetraaminopyrene was used instead of 3,3'-diaminobenzidine. The film had a 5% weight loss temperature of 550° C. or higher and a relative dielectric constant of 2.3.

EXAMPLE 19

A crosslinked polybenzimidazole film was prepared by the procedure of Example 13, except that 2,3,6,7-tetraaminoanthracene was used instead of 3,3'-diaminobenzidine. The film had a 5% weight loss temperature of 550° C. or higher and a relative dielectric constant of 2.3.

EXAMPLE 20

A crosslinked polybenzimidazole film was prepared by the procedure of Example 13, except that 1,3-diamino-4,6-bis(phenylamino)benzene was used instead of 3,3'-diaminobenzidine. The film had a 5% weight loss temperature of 550° C. or higher and a relative dielectric constant of 2.3.

EXAMPLE 21

A crosslinked polybenzoxazole film was prepared by the procedure of Example 13, except that 3,3'-dihydroxybenzidine was used instead of 3,3'-diaminobenzidine. The film had a 5% weight loss temperature of 550° C. or higher and a relative dielectric constant of 2.2.

EXAMPLE 22

A crosslinked polybenzothiazole film was prepared by the procedure of Example 13, except that 3,3'-dimercaptobenzidine was used instead of 3,3'-diaminobenzidine. The film had a 5% weight loss temperature of 550° C. or higher and a relative dielectric constant of 2.2.

EXAMPLE 23

A crosslinked polybenzimidazole film was prepared by the procedure of Example 13, except that 1,3,5,7-tetrakis(4-carboxyphenyl)adamantane and 1,2,4,5-tetraaminobenzene were used instead of 1,3,5,7-adamantanetetracarboxylic acid and 3,3'-diaminobenzidine, respectively. The film had a 5% weight loss temperature of 550° C. or higher and a relative dielectric constant of 2.2.

EXAMPLE 24

A crosslinked polybenzimidazole film was prepared by the procedure of Example 13, except that 1,3,5,7-tetrakis(4-carboxyphenyl)adamantane was used instead of 1,3,5,7-adamantanetetracarboxylic acid. The film had a 5% weight loss temperature of 550° C. or higher and a relative dielectric constant of 2.1.

COMPARATIVE EXAMPLE 4

A polymer film was prepared by the procedure of Example 13, except that a 2:1 (by weight) mixture of N-methylpyrrolidone (NMP) and cyclohexanone (CHN) was used as the solvent instead of N-methylpyrrolidone alone. The infrared absorption spectrum of the polymer film was determined. The polymer had strong absorption at around 2900 cm$^{-1}$ (2857 cm$^{-1}$ and 2928 cm$^{-1}$; cyclohexane ring of a Schiff base), indicating that a Schiff base formed as a result of the reaction between the solvent cyclohexanone and the monomer aromatic polyamine remains and inhibits the formation of imidazole rings. The film had a 5% weight loss temperature of 455° C. and a relative dielectric constant of 2.6.

Infrared absorption spectral data (cm$^{-1}$): 805 (m), 1280 (m), 1403 (m), 1450 (s), 1522 (w), 1625 (w), 2857 (s), 2928 (s), 3419 (w)

COMPARATIVE EXAMPLE 5

A polymer film was prepared by the procedure of Example 13, except that a 2:1 (by weight) mixture of N-methylpyrrolidone (NMP) and cyclopentanone (CPN) was used as the solvent instead of N-methylpyrrolidone alone. The infrared absorption spectrum of the polymer film was determined. The polymer had strong absorption at around 2900 cm$^{-1}$ (2857 cm$^{-1}$ and 2928 cm$^{-1}$; cyclopentane ring of a Schiff base), indicating that a Schiff base formed as a result of the reaction between the solvent cyclopentanone and the monomer aromatic polyamine remains and inhibits the formation of imidazole rings. The film had a 5% weight loss temperature of 450° C. and a relative dielectric constant of 2.7.

Infrared absorption spectral data (cm$^{-1}$): 805 (m), 1280 (m), 1403 (m), 1450 (s), 1522 (w), 1625 (w), 2857 (s), 2928 (s), 3419 (w)

COMPARATIVE EXAMPLE 6

A polymer film was prepared by the procedure of Example 13, except that a 2:1 (by weight) mixture of N-methylpyrrolidone (NMP) and acetone was used as the solvent instead of N-methylpyrrolidone alone. The infrared absorption spectrum of the polymer film was determined. The polymer had strong absorption at around 2900 cm$^{-1}$ (2857 cm$^{-1}$ and 2928 cm$^{-1}$; methylidene group of a Schiff base), indicating that a Schiff base formed as a result of the reaction between the solvent acetone and the monomer aromatic polyamine remains and inhibits the formation of imidazole rings. The film had a 5% weight loss temperature of 495° C. and a relative dielectric constant of 2.6.

Infrared absorption spectral data (cm$^{-1}$): 805 (m), 1280 (m), 1403 (m), 1450 (s), 1522 (w), 1625 (w), 2857 (m), 2928 (m), 3419 (w)

COMPARATIVE EXAMPLE 7

In a flask equipped with a stirrer and a condenser were placed 5.37 g (20 mmol) of 1,3,5-adamantanetricarboxylic acid, 6.43 g (30 mmol) of 3,3'-diaminobenzidine and 100 g of a polyphosphoric acid, followed by heating and stirring at 200° C. in a nitrogen atmosphere for 12 hours. After cooling, the reaction mixture was mixed with water, the precipitated solid was collected by filtration and was washed with aqueous sodium hydrogen carbonate solution, water, and methanol, to yield a polybenzimidazole as a solid. An attempt was made to dissolve the solid polybenzimidazole in a solvent, N-methylpyrrolidone (NMP), but was failed. Thus, a thin film could not be formed by spin coating, and a target thin film was not prepared.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A material for dielectric films, which is a polymerizable composition comprising:

an adamantanepolycarboxylic acid represented by following Formula (1a):

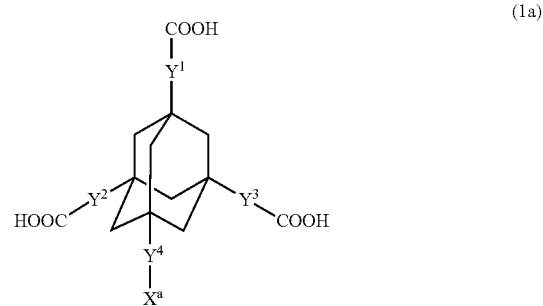

(1a)

wherein $X^a$ is a hydrogen atom or a hydrocarbon group; and $Y^1$, $Y^2$, $Y^3$ and $Y^4$ may be the same as or different from one another and are each a single bond or a bivalent aromatic cyclic group;

an aromatic polyamine represented by following Formula (2):

(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group; and a solvent other than ketones and aldehydes, wherein the adamantanepolycarboxylic acid and the aromatic polyamine are dissolved in the solvent.

2. A polymer which is a polymerized product of a polymerizable composition comprising:

an adamantanepolycarboxylic acid represented by following Formula (1a):

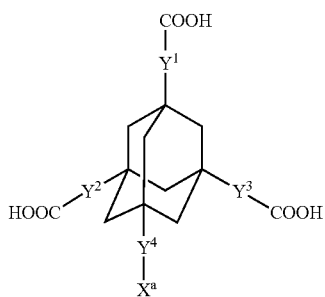

(1a)

wherein $X^a$ is a hydrogen atom or a hydrocarbon group; and $Y^1$, $Y^2$, $Y^3$ and $Y^4$ may be the same as or different from one another and are each a single bond or a bivalent aromatic cyclic group;

an aromatic polyamine represented by following Formula (2):

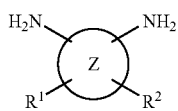

(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group; and a solvent other than ketones and aldehydes, wherein the adamantanepolycarboxylic acid and the aromatic polyamine are dissolved in the solvent.

3. A dielectric film comprising the polymer of claim 2.

4. A dielectric film comprising a polymer formed from:
an adamantanepolycarboxylic acid represented by following Formula (1a):

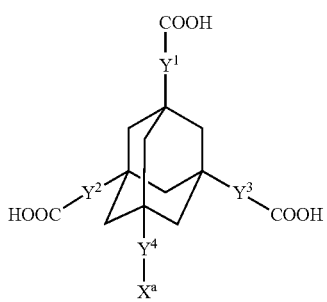

(1a)

wherein $X^a$ is a hydrogen atom or a hydrocarbon group; $Y^1$, $Y^2$, $Y^3$ and $Y^4$ may be the same as or different from one another and are each a single bond or a bivalent aromatic cyclic group; and an aromatic polyamine represented by following Formula (2):

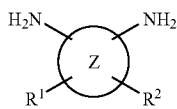

(2)

wherein Ring Z is a monocyclic or polycyclic aromatic ring; and $R^1$ and $R^2$ are each a substituent bound to Ring Z, may be the same as or different from each other and are each an amino group, a mono-substituted amino group, a hydroxyl group or a mercapto group, wherein the dielectric film has a 5% weight loss temperature of 500° C. or higher.

* * * * *